United States Patent
Brites et al.

(10) Patent No.: US 9,665,466 B2
(45) Date of Patent: May 30, 2017

(54) DEBUG ARCHITECTURE FOR MULTITHREADED PROCESSORS

(71) Applicant: Freescale Semiconductor, Inc., Austin, TX (US)

(72) Inventors: Celso Fernando Veras Brites, Campinas (BR); Alex Rocha Prado, Campinas (BR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/475,507

(22) Filed: Sep. 2, 2014

(65) Prior Publication Data
US 2016/0062874 A1    Mar. 3, 2016

(51) Int. Cl.
*G06F 9/44* (2006.01)
*G06F 11/36* (2006.01)

(52) U.S. Cl.
CPC .............................. *G06F 11/3636* (2013.01)

(58) Field of Classification Search
None
See application file for complete search history.

(56) References Cited

U.S. PATENT DOCUMENTS

| | | | |
|---|---|---|---|
| 5,053,949 A | 10/1991 | Allison et al. | |
| 5,390,332 A | 2/1995 | Golson | |
| 6,112,298 A | 8/2000 | Deao et al. | |
| 6,530,047 B1 * | 3/2003 | Edwards | G01R 31/31903 709/224 |
| 6,915,414 B2 | 7/2005 | Yearsley et al. | |
| 6,988,264 B2 | 1/2006 | Sarma et al. | |
| 7,600,155 B1 | 10/2009 | Nickolls et al. | |
| 7,711,990 B1 | 5/2010 | Nickolls et al. | |
| 8,370,806 B2 * | 2/2013 | Codrescu | G06F 9/3005 714/35 |
| 8,683,444 B1 * | 3/2014 | Spycher | G06F 11/3636 717/124 |
| 2005/0188358 A1 * | 8/2005 | Johnson | G06F 11/3648 717/129 |

* cited by examiner

*Primary Examiner* — Evral E Bodden

(57) ABSTRACT

Debug architecture for multithreaded processors. In some embodiments, a method includes, in response to receiving a halt command, saving a context of a thread being executed by a processor core to a context memory distinct from the processor core; suspending execution of the thread; and initiating a debug of the thread using the context stored in the context memory. In other embodiments, an integrated circuit includes a processor core; a context management circuit coupled to the core; and a debug support circuit coupled to the context management circuit, the debug support circuit configured to send a halt request to the context management circuit and the context management circuit configured to, in response to having received the request, facilitate a debug operation by causing execution of a thread running on the core to be suspended and saving a context of the thread into a context memory distinct from the core.

19 Claims, 5 Drawing Sheets

| CTXMEM | 203 | T0-TN | T0-TN | T0-TN | T0-TN | T0-TN | T0-TN | ... |
|---|---|---|---|---|---|---|---|---|
| CTX1 | 204 | T0 | T0 | T0 | T0 | T0 | T0 | ... |
| CTX2 | 205 | -- | T1 | T1 | T1 | T1 | T1 | ... |
| P1 | 206 | T0 | T0 | T1 | T1 | T1 | T1 | ... |
| P2 | 207 | T0 | T0 | T0 | T1 | T1 | T1 | ... |
| P3 | 208 | T0 | T0 | T0 | T0 | T1 | T1 | ... |
| P4 | 209 | T0 | T0 | T0 | T0 | T0 | T1 | ... |

DEBUG ARCHITECTURE FOR MULTITHREADED PROCESSORS

FIELD

This disclosure relates generally to processors, and more specifically, to systems and methods for a debug architecture for multithreaded processors.

BACKGROUND

Processors are electronic circuits capable of executing one or more sequences of instructions, tasks, or threads. In a conventional processor, operations are executed in series. As such, if an operation takes a long time to complete (e.g., if its completion depends upon the result of an external event), a subsequent operation still has to wait in a queue. The wait occurs even when execution of the subsequent operation is independent from that of the preceding operation, and regardless of whether the processor is otherwise available during that time.

The concept of multithreading or multitasking was developed, at least in part, to improve the use of available computing resources. Generally speaking, a multithreading or multitasking processor includes hardware support for switching between different instructions, tasks, or threads more efficiently than conventional processors.

As a processor operates, errors may occur. And, in the event of a processing error, techniques exist to capture state information of the processor at the time of the error. Such information may include, for instance, register values, pointers, program counters, condition codes, and the like. Once captured, a debugging tool may then be used to analyze that information. As the inventors hereof have recognized, even in the case of a multithreading processor, however, debug operations necessary to capture state information can still cause the multithreading processor to halt the execution of other instructions or threads.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 4 is a table illustrating an example of temporal multithreading with four pipeline stages, according to some embodiments.

DETAILED DESCRIPTION

Figure 1:
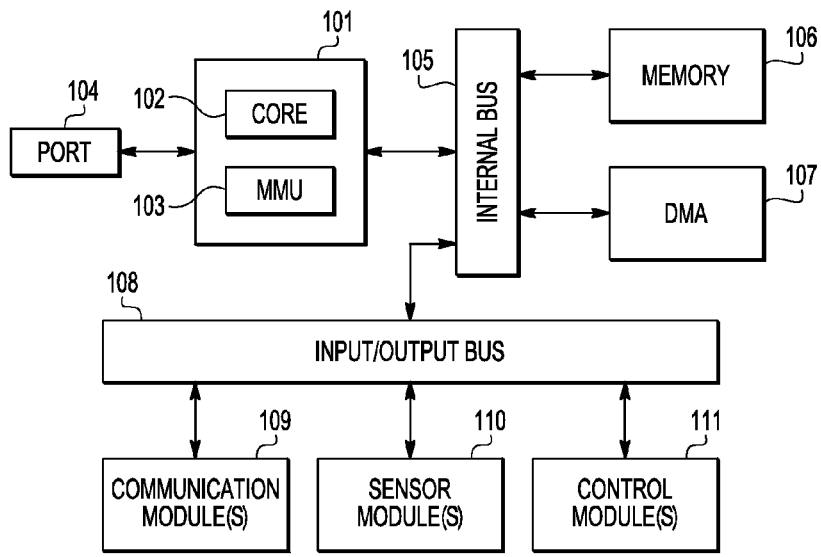
FIG. 1 is a block diagram of a processor according to some embodiments.

Embodiments disclosed herein are directed to a debug architecture for multithreaded processors. In some implementations, these systems and methods may be applicable to various types of microcontrollers, controllers, microprocessors, processors, central processing units (CPUs), programmable devices, etc., which are generically referred to herein as "processors." In general, a processor may be configured to perform a wide variety of operations—and may take a variety of forms—depending upon its particular application (e.g., automotive, communications, computing and storage, consumer electronics, energy, industrial, medical, military and aerospace, etc.). Accordingly, as will be understood by a person of ordinary skill in the art in light of this disclosure, the processor(s) described below are provided only for sake of illustration, and numerous variations are contemplated.

In various implementations, systems and methods described herein may be used to provide debug support logic with access to information manipulated by a processor's one or more cores, with multiple threads and/or automatic context switch features, and without interfering with the processor's pipeline. As such, these systems and methods may allow having one or more threads in debug mode while others continue to execute. In some cases, not being affected by the debug access logic, the pipeline logic may be made simpler, smaller, and faster.

A debug architecture as described herein may be configured to support processor cores with context switching, where the context is stored in a memory or secondary register file. For example, such a system may include: (a) one or more processor cores (including pipeline and registers/flags), (b) context storage (memory or register file) used to store thread contexts with suspended execution, (c) a context unit responsible for executing save/restore of context to/from the context storage from/into the processor state registers/flags, and (d) a debug support unit.

The foregoing debug architecture may context switch between multiple application threads, saving and restoring them from the context storage. The context unit may execute a context switch upon a request from dedicated scheduling hardware, a software request, or a halt command from the debug support unit or the processor itself. Halt requests may make the context unit suspend the execution of the running thread and save its context into the context storage, as it does in a thread preemption operation. However, in this case, the halted thread may only be put back into normal execution upon a request from the debug unit. This halting process may be performed with multiple threads, so that a plurality of them can be halted in a given time. The threads in halt state may have their contexts accessed by the debug unit through the arbitration of the context unit. The processor cores can continue executing code from other threads not halted, context switches being performed as usual.

In some embodiments, systems and methods for a debug architecture described herein may leverage hardware context memory and switch mechanism used in conventional multithreading applications to implement hardware debug support features. The same mechanism(s) used to save/restore thread context to/from context storage may provide debug features such as breakpoint, single-step, register/flag examining and modification.

Turning to FIG. 1, a block diagram of processor 100 is depicted according to some embodiments. As shown, processing block 101 includes at least one core 102, which may be configured to execute programs, interrupt handlers, etc. In various embodiments, core 102 may include any suitable 8, 16, 32, 64, 128-bit, etc. processing core capable of implementing any of a number of different instruction set architectures (ISAs), such as the x86, POWERPC®, ARM®, SPARC®, or MIPS® ISAs, etc. In additional or alternative implementations, core 102 may be a graphicsprocessing unit (GPU) or other dedicated graphics-rendering device. Processing block 101 also includes memory management unit (MMU) 103, which may in turn include one or more translation look-aside buffers (TLBs) or the like, and which may be configured to translate logical addresses into physical addresses. Port controller 104 is coupled to processing block 101 and may allow a user to test processor 100, perform debugging operations, program one or more aspects of processor 100, etc. Examples of port controller 104 may include a Joint Test Action Group (JTAG) controller and/or a Nexus controller. Internal bus 105 couples system memory 106 and Direct Memory Access (DMA) circuit or module 107 to processing block 101. In various embodiments, internal bus 105 may be configured to coordinate traffic between processing block 101, system memory 106, and DMA 107.

System memory 106 may include any tangible or non-transitory memory element, circuit, or device, which, in some cases, may be integrated within processor 100 as one chip. For example, system memory 106 may include registers, Static Random Access Memory (SRAM), Magnetoresistive RAM (MRAM), Nonvolatile RAM (NVRAM, such as "flash" memory), and/or Dynamic RAM (DRAM) such as synchronous DRAM (SDRAM), double data rate (e.g., DDR, DDR2, DDR3, etc.) SDRAM, read only memory (ROM), erasable ROM (EROM), erasable programmable ROM (EPROM), electrically erasable programmable ROM (EEPROM), etc. In some cases, memory 106 may also include one or more memory modules to which the memory devices are mounted, such as single inline memory modules (SIMMs), dual inline memory modules (DIMMs), etc. DMA 107 includes a programmable data transfer circuit configured to effect certain memory operations (e.g., on behalf of modules 109-111) without intervention from processing block 101.

Input/output (I/O) bus 108 is coupled to internal bus 105 (e.g., via a bus interface) as well as communication module(s) 109, sensor module(s) 110, and control module(s) 111. In some embodiments, I/O bus 108 may be configured to coordinate I/O traffic and to perform any protocol, timing, and/or other data transformations to convert data signals from one component (e.g., sensor module(s) 110) into a format suitable for use by another component (e.g., processing block 101). Communication module(s) 109 may include, for example, a Controller Area Network (CAN) controller, a serial, Ethernet, or USB controller, a wireless communication module, etc. Sensor module(s) 110 and control module(s) 111 may include circuitry configured to allow processor 100 to interface with any suitable sensor or actuator (not shown).

Embodiments of processor 100 may include, but are not limited to, application specific integrated circuit (ASICs), system-on-chip (SoC) circuits, digital signal processor (DSPs), processors, microprocessors, controllers, microcontrollers, or the like. As previously noted, different implementations of processor 100 may take different forms, and may support various levels of integration. For example, in some applications, DMA 107 may be absent or replaced with custom-designed memory access circuitry. In other applications, internal bus 105 may be combined with I/O bus 108. In yet other applications, one or more other blocks shown in FIG. 1 (e.g., modules 109-111) may be combined into processing block 101. In various embodiments, processor 100 may be a "multi-core" processor having two or more cores (e.g., dual-core, quad-core, etc.) and/or two or more processing blocks 101. It is noted that elements such as clocks, timers, etc., which are otherwise ordinarily found within processor 100, have been omitted from the discussion of FIG. 1 for simplicity of explanation.

In some embodiments, processor 100 may be employed in real-time, embedded applications (e.g., engine or motor control, intelligent timers, etc.) that benefit from the efficient use of processor 100's processing resources. Additionally or alternatively, processor 100 may be deployed in energy-scarce environments (e.g., in battery or solar-powered devices, etc.) that also benefit from a more efficient use of processing resources. Accordingly, processor 100 may be fitted with elements, circuits, or modules configured to implement one or more temporal multithreading techniques, as described in more detail in connection with FIGS. 2-4.

At this point it is appropriate to note that the term "thread," as used herein, generally refers to a unit of processing, and that the term "multithreading" refers to the ability of a processor (e.g., processor 100) to switch between different threads, thereby attempting to increase its utilization. In some environments, "units of processing" may be referred to as "tasks" or simply as a "processes," and therefore it should be understood that one or more of the techniques described herein may also be applicable to "multitasking" or "multiprocessing." When switching between threads, a processor may also switch between corresponding "contexts." Generally speaking, a "thread context" is a set of data or variables used by a given thread that, if saved or otherwise preserved, allows the thread to be interrupted—e.g., so that a different thread may be executed—and then continued at a later time (specific data or variables making up a thread context may depend upon the type of processor, application, thread, etc.). As also used herein, the term "pipelining" generally refers to a processor's ability to divide each instruction into a particular sequence of operations or stages (e.g., fetch, decode, etc.) and to execute each stage separately. In some cases, distinct electrical circuits and/or portions of the same processor core (e.g., core 102 in FIG. 1) may be involved in implementing each pipelining stage. Thus, for example, a single processor core may be capable of executing a fetch operation of a first instruction, a decode operation of a second instruction, and an execute operation of a third instruction all concurrently or simultaneously (e.g., during a same clock cycle).

There are two distinct types of multithreading—temporal and simultaneous. In "simultaneous multithreading," instructions from more than one thread execute in any given pipeline stage at the same time. In "temporal multithreading," however, a single thread of instructions is executed in a given pipeline stage at a given time.

Figure 2:
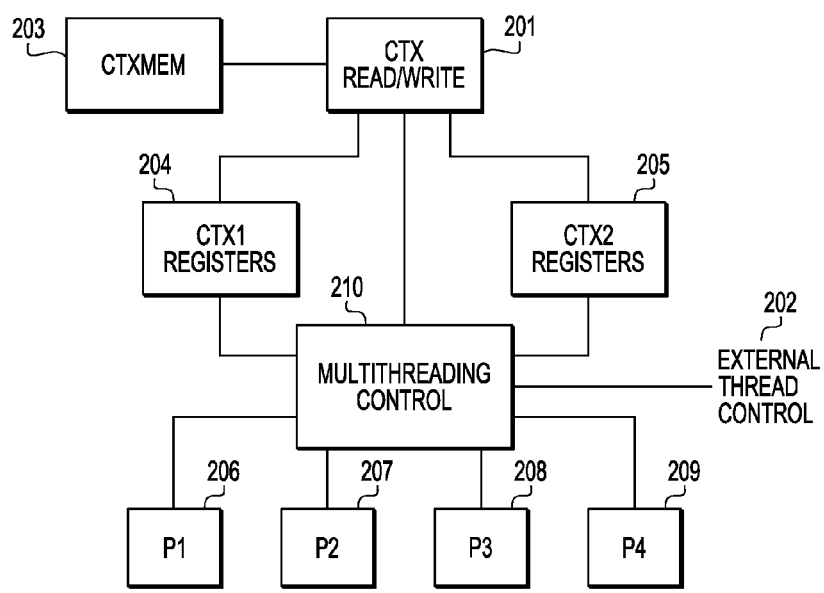
FIG. 2 is a block diagram of a temporal multithreading circuit according to some embodiments.

Turning now to FIG. 2, a block diagram of temporal multithreading circuit 200 is depicted. As illustrated, context memory CTXMEM 203 is coupled to context read/write controller 201, which in turn is coupled to multithreading control engine 210. Context read/write controller 201 and multithreading control engine 210 are both operably coupled to first context register set or bank CTX1 204 and to second context register set or bank CTX2 205. Multithreading control engine 210 is operably coupled to each of a plurality of pipeline stages P1-P4 206-209, as well as external thread control 202. In some embodiments, elements 201, 202, and 204-210 of circuit 200 may be implemented within core 102 of processor 100, shown in FIG. 1. Accordingly, in the case of a multi-core implementation, each of elements 201, 202, and 204-210 of circuit 200 may be repeated within each respective core (so that each such core may perform one or more of the operations described below independently of each other). Context memory CTXMEM 203 may reside outside of core 102 and, in a multi-core implementation, it may be operably coupled to and/or shared among the plurality of cores.

In operation, context memory CTXMEM 203 may be configured to store a plurality of thread contexts under control of context read/write controller 201. For example, context read/write controller 201 may retrieve a thread context from CTXMEM 203 and store it in one of register sets or banks CTX1 204 or CTX2 205, each of which including registers that define a processor's programming model (e.g., pc, sp, r0, . . . , rn, etc.). After the thread context is retrieved and stored in one of register sets CTX1 204 or CTX2 205, pipeline stages P1-P4 206-209 may be capable of executing a given thread based on that thread context. For instance, in some embodiments, first pipeline stage P1 206 may perform a "fetch" operation, second pipeline stage P2 207 may perform a "decode" operation, third pipeline stage P3 208 may perform an "execute" operation, and fourth pipeline stage P4 209 may perform a "write-back" operation. In other embodiments, however, other number of pipeline stages (e.g., 3, 5, 6, etc.) may be used, and different operations may be associated with each stage.

When a thread's execution is complete or otherwise halted (e.g., upon actual completion of the thread, triggering of an interrupt, etc.), context read/write controller 201 may retrieve an updated thread context from a respective one of register sets CTX1 204 or CTX2 205, and it may store the updated context in context memory CTXMEM 203. In various implementations, context memory CTXMEM 203 may be separate from system memory 106 and/or it may be dedicated exclusively to the storage of thread contexts and/or it may be accessible by software.

In some embodiments, multithreading control engine 210 may be configured to control the transit or flow of thread contexts between context memory CTXMEM 203 and register sets CTX1 204/CTX2 205 in response to a signal, command, or indication received from external thread control 202. Examples of external thread control 202 may include sources or events (i.e., context switch events) such as, for instance, hardware or software schedulers, timer overflows, completion of external memory operations, completion of analog to digital conversions, logic level changes on a sensor's input, data received via a communication interface, entering of a sleep or power-saving mode, etc. Multithreading control engine 210 may also be configured to receive messages or instructions (e.g., read and write instructions) from pipeline stages P1-P4 206-209, and to direct each instruction to an appropriate one of register sets CTX1 204 or CTX2 205. Accordingly, pipeline stages P1-P4 206-209 may issue instructions that are context-agnostic— i.e., each pipeline stage may execute instructions without knowing which thread is being executed—because multithreading control engine 210 may be in charge of directing those instructions to an appropriate one between register sets CTX1 204/CTX2 205 at an appropriate time.

For example, during execution of a first thread, multithreading control engine 210 may direct all instructions received from each pipeline stages P1-P4 206-209 to first register set CTX1 204, and first register set CTX1 204 may be configured to store a first thread context corresponding to the first thread. In response to a command received from external thread control 202 to switch execution to a second thread, multithreading control engine 210 may cause context read/write controller 201 to retrieve a second thread context (corresponding to the second thread) from context memory CTXMEM 203, and to store that second thread context in second register set CTX2 205. In some cases, this retrieve and store operation may occur without interruption of the first thread, which continues to execute based on the contents of first register set CTX1 204. Then, multithreading control engine 210 may direct an instruction from first pipeline stage P1 206 to second register set CTX2 205 to thereby begin execution of the second thread. Moreover, instructions already in the pipeline may continue to execute after the second thread has begun. For instance, multithreading control engine 210 may direct an instruction from second pipeline state P2 207 to first register set CTX1 204 to continue execution of the first thread. These, as well as other operations, are described in more detail below with respect to FIGS. 3 and 4.

In some embodiments, the modules or blocks shown in FIG. 2 may represent processing circuitry and/or sets of software routines, logic functions, and/or data structures that, when executed by the processing circuitry, perform specified operations. Although these modules are shown as distinct blocks, in other embodiments at least some of the operations performed by these blocks may be combined in to fewer blocks. For example, in some cases, context read/write controller 201 may be combined with multithreading control engine 210. Conversely, any given one of modules 201-210 may be implemented such that its operations are divided among two or more blocks. Although shown with a particular configuration, in other embodiments these various modules or blocks may be rearranged in other suitable ways.

Figure 3:
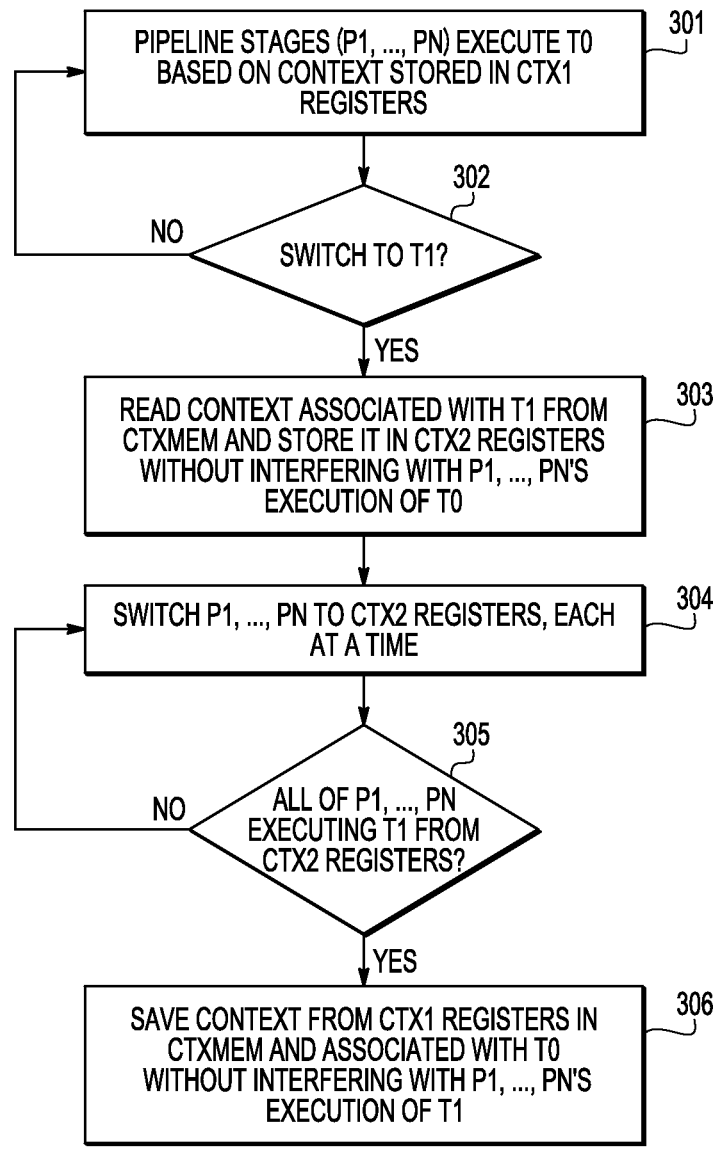
FIG. 3 is a flowchart of a method of temporal multithreading according to some embodiments.

FIG. 3 is a flowchart of a method of temporal multithreading. In some embodiments, method 300 may be performed at least in part, by temporal multithreading circuit 200 of FIG. 2 within core 102 of processor 100 in FIG. 1. At block 301, a plurality of pipeline stages P1-P4 206-209 execute a first thread T0 based on thread context data and/or variables stored in a first register set CTX1 204. At block 302, method 300 determines whether to switch to the execution of a second thread T1. For example, as noted above, external thread control 202 may transmit a command specifically requesting the thread or context switch to T1. If not, control returns to block 302. Otherwise control passes to block 303.

At block 303, method 300 reads thread context data and/or variables associated with second thread T1 from context memory from CTXMEM 203, and stores it in second register set CTX2 205. The process of block 303 may occur under control of temporal multithreading circuit 200 and without interfering with the execution of first thread T0 between pipeline stages P1-P4 206-209 and first register set CTX1 204. In other words, while context read/write controller 201 retrieves T1's thread context from context memory CTXMEM 203 and stores it in second register set CTX2 205, temporal multithreading circuit 210 may continue to direct or send one or more instructions from pipeline stages P1-P4 206-209 to first register set CTX1 204.

At block 304, method 300 may switch each of the plurality of pipeline stages P1-P4 206-209 to execute second thread T1 based on the thread context data and/or variables newly stored in second register set CTX2 205. To achieve this, temporal multithreading circuit 200 may direct, send, or transmit instructions received from each of pipeline stages P1-P4 206-209 to second register set CTX2 205—i.e., instead of first register set CTX1 204. Moreover, the process of block 304 may be implemented such that each pipeline stage is switched from T0 to T1 one at a time (e.g., first P1 206, then P2 207, followed by P3 208, and finally P4 209). Pipeline stages that have not switched to the second thread T1 during this process may continue to have one or more instructions directed to first register set CT1 204 (independently and/or in the absence of a command to resume and/or continue execution of the first thread T0).

For example, a first instruction received from first pipeline stage P1 206 may be directed to second register set CTX2 205, and a second instruction received from second pipeline stage P2 207 concurrently with or following (e.g., immediately following) the first instruction may be directed to first register set CTX1 204. Then, in a subsequent clock cycle(s), a third instruction received from second pipeline stage P2 207 may be directed to second register set CTX2 205, and a fourth instruction received from third pipeline stage P3 208 concurrently with or following (e.g., immediately following) the third instruction may be directed to first register set CTX1 204. The process may then continue in a cascaded manner until all pipeline stages have switched to the execution of second thread T1—i.e., until all instructions are directed to second register set CTX2 205.

At block 305, method 300 determines whether all pipeline stages have switched to the execution of second thread T1. If not, control returns to block 304. Otherwise, control passes to block 306. At block 306, method 300 saves the last updated version of the first thread context data and/or variables, still stored in first register set CTX1 204, to context memory CTXMEM 203. Similarly as explained above, the process of block 306 may occur without interfering with the execution of the second thread T1 between P1-P4 206-209 and second register set CTX2 205.

It should be understood that, in several applications, method 300 may be repeated to support subsequent thread context switches. For example, after block 306 and in response to another command to switch to execution to another thread, method 300 may determine whether the other thread is the same as T0, in which case there is no need to retrieve the corresponding thread context from context memory CTXMEM 203 (it is still available in first register set CTX1 204). Then, method 300 may switch the execution of each pipeline stage P1-P4 206-209, one at a time, back to first register set CTX1 204. For example, first pipeline stage P1 206 may have an instruction directed to first register set CTX1 204 to resume execution of T0, while second pipeline stage P2 207 may have a subsequent instruction directed to second register set CTX2 205 to continue execution of T1—and so on, until all pipeline stages P1-P4 206-209 have switched back to T0.

On the other hand, in the more general case where the other thread is in fact a third thread (T2) that is different from T0 (and T1), a corresponding thread context may be retrieved from context memory CTXMEM 203 and stored in first register set CTX1 204, thus replacing the thread context of first thread T0 previously residing in CTX1 204, and without interrupting execution of second thread T1 between pipeline stages P1-P4 206-209 and second register set CTX2 205. Again, method 300 may switch the execution of each pipeline stage P1-P4 206-209, one at a time, to first register set CTX1 204. For example, first pipeline stage P1 206 may have an instruction directed to first register set CTX1 204 to initiate execution of third thread T2, while second pipeline stage P2 207 has a subsequent instruction directed to second register set CTX2 205 to continue execution of second thread T1—and so on, until all stages have switched to T2.

To further illustrate method 300, FIG. 4 depicts table 400 showing an example of temporal multithreading with four pipeline stages according to some embodiments. Each column in table 400 represents one or more clock cycles, and has retained a number that corresponds to a respective block in method 300 for ease of explanation. At column 301, all pipeline stages P1-P4 206-209 are shown executing first thread T0 based upon a corresponding thread context stored in first register set CTX1 204. Second register set CTX2 205 is empty and/or its initial state may not be relevant. Block 302 of FIG. 3 is illustrated in table 400 as taking place between columns 301 and 303, when external thread control 202 transmits a command to multithreading control engine 210 requesting a switch from first thread T0 to second thread T1.

Sometime after having received the context switch command (e.g., after one or more clock cycle(s)), column 303 shows that a thread context corresponding to second thread T1 has been stored in second register set CTX2 205, while pipeline stages P1-P4 206-209 are still executing first thread T0 based on the thread context stored in first register set CTX1 204. In other words, as noted above, the thread context of second thread T1 may be retrieved from context memory CTXMEM 203 and stored in second register set CTX2 205 without interfering with the execution of first thread T0.

Columns 304 show each of pipeline stages P1-P4 206-209 being sequentially switched from T0 to T1 in a cascaded fashion under control of multithreading control engine 210. Specifically, at a first clock cycle(s) within columns 304, only first pipeline stage P1 206 has its instruction(s) directed to second register set CTX2 205, but subsequent pipeline stages P2-P4 207-209 still have their instructions directed to first register set CTX1 204 by multithreading control engine 210. This may occur without there having been an explicit command or request that pipeline stages P2-P4 continue execution of first thread T0. Because this example involves four pipeline stages, it may take four clock cycles for all pipeline stages to complete their transitions to second thread T1. This is shown in column 305, where all of P1-P4 206-209 are executing second thread T1 based on the thread context stored in second register set CTX2 205. Here it should be noted that, during at least a portion of the context switching operation, both first and second thread T0 and T1 are being executed simultaneously, concurrently, or in parallel under control of multithreading control engine 210. As such, neither of T0 or T1's execution is interrupted by the switching operation, which in many cases may result in the more effective use of processor resources.

Still referring to FIG. 4, context memory CTXMEM 203 is shown in table 400 as storing a plurality of thread contexts T0-TN at all times. However, context memory CTXMEM 203 does not have the most up-to-date version of all thread contexts all the time. For example, context memory CTXMEM 203 does not have the latest context corresponding to first thread T0 while T0 is being executed by one or more of pipeline stages P1-P4 206-209 (i.e., during the clock cycles shown between column 301 and the next-to-last column in 304). But at column 305 first thread T0 is no longer being executed by any pipeline stage. Therefore, block 306 is also represented in table 400 as illustrating multithreading control engine 210's command to context read/write controller 201 to retrieve the updated thread context for T0 from first register set CTX1 204 and to store it in context memory CTXMEM 203. Similarly, context memory CTXMEM 203 does not have the most up-to-date version of second thread T1 while T1 is being executed by one or more of pipeline stages P1-P4 206-209—i.e., during the clock cycles shown in columns 304. After a subsequent context switching operation (not shown), an updated version of T1 may also be stored in context memory CTXMEM 203.

As described above, in some embodiments, some of the systems and methods described herein may provide a processor configured to executes many threads, via hardware-switching, and using only two context register sets. Other embodiments may include more context register sets. Moreover, the processor uses two thread contexts during at least one or more of the same clock cycles—i.e., concurrently, simultaneously, or in parallel. Accordingly, pipeline stages within such a processor may therefore remain busy, even during context switch operations, thus improving its utilization and efficiency. A separate memory (e.g., context memory CTXMEM 203) may be used for context saving, and it may be invisible to the programming or software model, thus not interfering with its execution.

In some cases, a large number of thread contexts may be stored in a dedicated context memory at a small design or silicon cost (e.g., RAM has a relatively small footprint and/or power requirements), thus reducing the need for relatively more expensive components (e.g., in an embodiment, only two register sets CTX1 204 and CTX2 205 may be employed, which generally have a large footprint and/or power requirements per context compared to context memory CTXMEM 203), as well as reducing the costs of running two or more threads. Moreover, a pair of register sets CTX1 204 and CTX2 205 may be both accessed by the execution pipeline stages P1-P4 206-209 concurrently, simultaneously, or in parallel during at least a portion of the context switching operation, and both may be either source or target for context save/restore operation(s). As a person of ordinary skill in the art will recognize in light of this disclosure, these and other features may enable a more efficient use of processor resources and/or electrical power.

Figure 5:
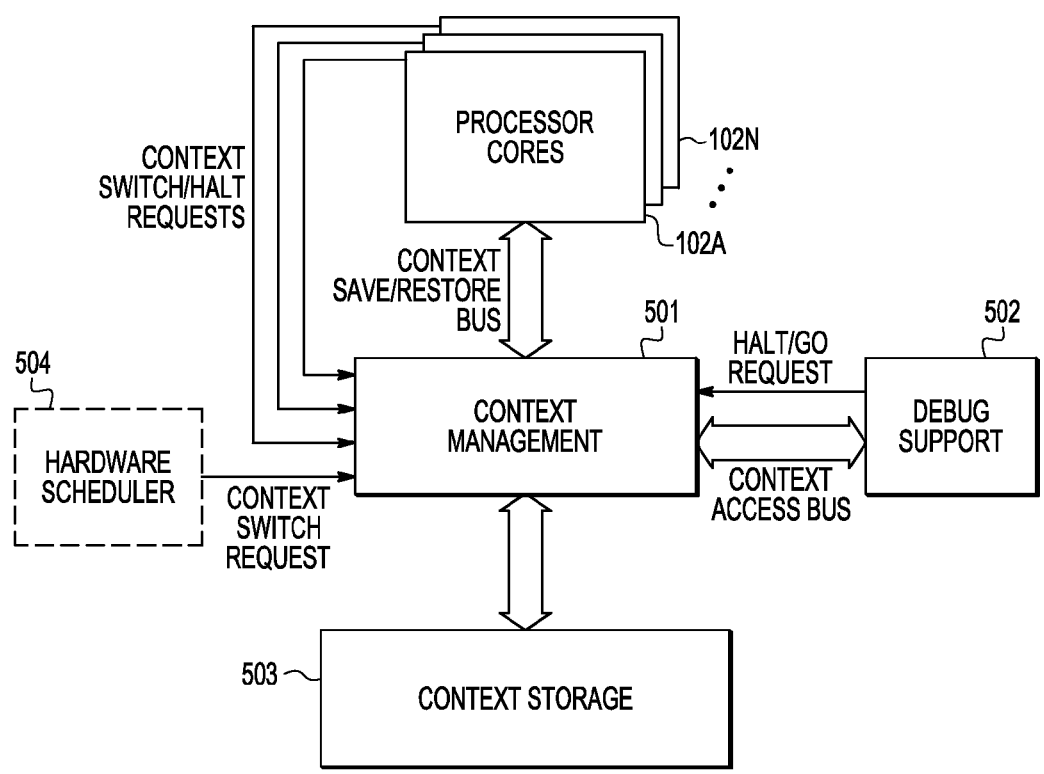
FIG. 5 is a block diagram of an example of a debug architecture for multithreaded processors according to some embodiments.

FIG. 5 is a block diagram of an example of debug architecture 500 for multithreaded processors. In some embodiments, architecture 500 may be implemented in connection with processor 100 of FIG. 1 and temporal multithreading circuit 200 of FIG. 2. Particularly, context storage block 503 may be used to implement context memory CTXMEM 203 outside of processor cores 102A-N. Context management block 501 may include, for instance, context read/write controller 201 and/or multithreading control engine 210. In operation, processor core(s) 102A-N may be configured to execute one or more threads simultaneously or concurrently, and each core may be capable of switching between two or more such threads or processes.

In FIG. 5, debug support block 502 is coupled to context management block 501, which in turn is coupled to processor core(s) 102A-N, context storage block 503, and hardware scheduler block 504. Generally, debug support block 502 may be configured to send halt and go requests or commands to context management block 501 in order to initiate and/or terminate a debug process. The debug process may be triggered, for example, under control of hardware scheduler block 504 and/or in response to a command from software (e.g., a breakpoint) under execution by the processor core(s) 102A-N. Debug support block 502 may also access content storage block 503 via context management block 501 using a context access bus or the like.

Processor core(s) 102A-N may be configured to perform context save and restore transactions with context storage 503 through context management block 501 via a save/restore bus. Processor core(s) 102A-N may also receive and/or transmit context switch and/or halt requests to or from context management block 501. Hardware scheduler 504 may be configured to issue context switch requests to context management block 501.

Figure 6:
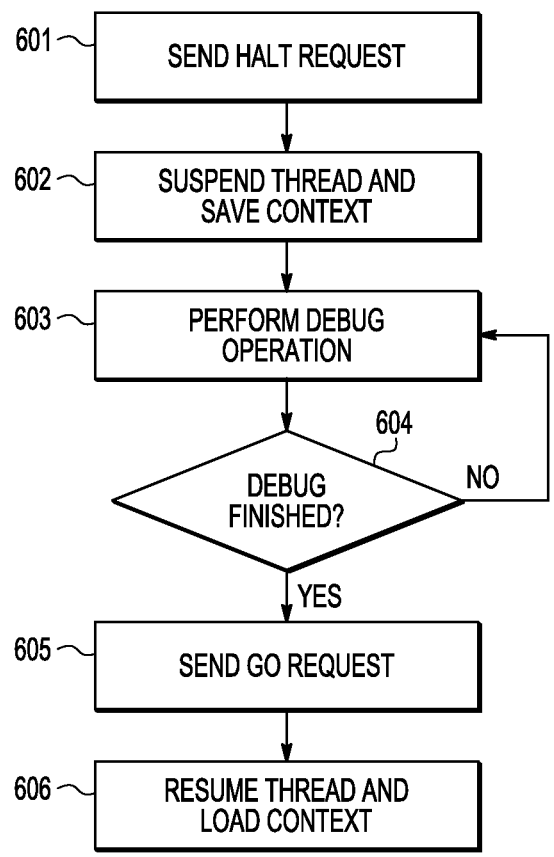
FIG. 6 is a flowchart of a method for performing a debug procedure for multithreaded processors, according to some embodiments.

Operation of debug architecture 500 may be explained with reference to FIG. 6. Specifically, FIG. 6 is a flowchart of method 600 for performing a debug procedure in multithreaded processors. In some embodiments, method 600 may be performed, at least in part, using debug architecture 500. At block 601, method 600 includes sending a halt request from debug support block 502 to context management block 501. The halt request or command may be received, for example, in response to a command from hardware scheduler 504 or in response to a command from debug software under execution by processor core(s) 102A-N.

At block 602, in response to receiving a halt command, context management block 501 may cause a given one of processor cores 102A-N to save the context of a thread onto context storage block 503, and may suspend execution of that thread. At block 603, a debug operation is performed based upon the context stored in context storage 503, and without there having to be access to internal components of processor core(s) 102A-N (e.g., registers, etc.). At block 604, debug support block 502 determines whether the debug process is finished. If not control returns to block 603.

If the debug process is finished, then at block 605 debug support block 502 sends a go request or command to context management block 501, which at block 606 allows processor core(s) 102A-N to resume execution of the suspended thread, for example, by loading the context of the thread from context storage block 503 back onto internal registers of processor core(s) 102A-N.

In some embodiments, processor core(s) 102A-N may be configured to execute a second thread at least in part while the execution of a first thread is suspended. The second thread may be executed using a second context stored in the context memory prior to receipt of the go command. Moreover, two or more debug operations may be performed concurrently for two different threads. For example, in response to receiving a second halt command, the second context may be stored in the context memory, execution of the second thread may be suspended, and a debug of the second thread may be executed at least in part concurrently with the debug of the first thread using the second context—that is, the second halt command may be issued prior to issuance of the first thread's go command.

Also, in some cases, in response to receiving a context switch command from hardware scheduler 504, for example, and after having received the halt command, context management block 501 prioritizes execution of the context switch command over execution of the halt command.

As explained herein, in an illustrative, non-limited embodiment, an integrated circuit may include a processor core; a context management circuit operably coupled to the processor core; and a debug support circuit operably coupled to the context management circuit, where the debug support circuit is configured to send a halt request to the context management circuit, and where the context management circuit is configured to, in response to having received the halt request, facilitate a debug operation by causing execution of a thread running on the processor core to be suspended and saving a context of the thread into a context memory distinct from the processor core.

For example, the halt request may be issued in response to a command from a scheduling circuit operably coupled to the context management circuit. Additionally or alternatively, the halt request may be issued in response to a command from software under execution by the processor core. Moreover, the processor core may be configured to execute a second thread at least in part while the execution of the thread is suspended.

The debug support circuit may be further configured to issue a go request, and where the context management circuit is configured to allow the processor core to resume execution of the thread using the context in response to having received the go request.

The debug support circuit may be configured to issue a second halt request to the context management circuit, and the context management circuit may be configured to, in response to having received the second halt request, facilitate a second debug operation by causing execution of a second thread running on the processor core to be suspended and saving a context of the second thread into the context memory. The second debug operation may occur at least in part concurrently with the debug operation. The context management circuit may be configured to receive a context switch command after having received the halt request, and the context management circuit may be configured to prioritize execution of the context switch command over execution of the halt request.

In another illustrative, non-limiting embodiment, a method may include, in response to receiving a halt command, saving a context of a thread being executed by a processor core to a context memory distinct from the processor core; suspending execution of the thread; and initiating a debug of the thread using the context stored in the context memory. The method may further include executing a second thread at least in part while the execution of the thread is suspended.

In response to receiving a go command, the method may include loading the context of the thread from the context memory onto the processor core, and resuming execution of the thread. The method may also include executing a second thread using a second context stored in the context memory prior to receipt of the go command. The method may further include, in response to receiving a second halt command, saving a second context of a second thread being executed by the processor in the context memory; suspending execution of the second thread; and initiating a debug of the second thread at least in part concurrently with the debug of the thread using the second context stored in the context memory. The method may also include receiving a context switch command after having received the halt command, and prioritizing execution of the context switch command over execution of the halt command.

In yet another illustrative, non-limiting embodiment, a debug support circuit may include a logic unit; and a memory coupled to the logic unit, the memory having program instructions stored thereon that, upon execution by the logic unit, cause the debug support circuit to: transmit a first command to a context management circuit, where the context management circuit is coupled to a processor, and where the context management circuit is configured to cause execution of a thread running on the processor to be suspended and save a context of the thread into a context memory distinct from the processor in response to the first command; determine that the a debug operation has been completed with respect to the thread; and transmit a second command to the context management circuit, where the context management circuit is configured to allow the processor to resume execution of the thread in the context memory in response to the second command.

The first and second commands may be transmitted in response to a command from a hardware circuit coupled to the context management circuit. Additionally or alternatively, the first and second commands may be transmitted in response to a command from software executed by the processor. The processor may be configured to execute a second thread at least in part while the execution of the thread is suspended.

The program instructions, upon execution by the logic unit, may further cause the debug support circuit to transmit a third command to the context management circuit, where the context management circuit is configured to, in response to having received the third command, cause execution of a second thread running on the processor to be suspended and save a context of the second thread into the context memory; determine that a second debug operation has been completed with respect to the second thread; and transmit a fourth command to the context management circuit, where the context management circuit is configured to allow the processor to resume execution of the second thread in response to the fourth command. Also, the third command may be transmitted prior to transmission of the second command and while execution of the thread is suspended.

In some embodiments, the blocks shown in FIGS. 1, 2, and 5 may represent processing circuitry and/or sets of software routines, logic functions, and/or data structures that, when executed by the processing circuitry, perform specified operations. Although these modules are shown as distinct logical blocks, in other embodiments at least some of the operations performed by these modules may be combined in to fewer blocks. Conversely, any given one block may be implemented such that its operations are divided among two or more logical blocks. Although shown with a particular configuration, in other embodiments these various modules or blocks may be rearranged in other suitable ways.

It should be understood that the various operations explained herein, particularly in connection with FIGS. 3, 4, and 6, may be implemented in software executed by processing circuitry, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An integrated circuit, comprising:
a multithreading control circuit including hardware context switch circuitry configured to control multithreading operations within a processor core, wherein the hardware context switch circuitry includes at least two separate sets of context registers and a distinct context memory, wherein each of the two distinct sets of context registers is coupled to the multithreading control circuit, and wherein the context memory is coupled to the multithreading control circuit and to the sets of context registers via a context read/write controller; and
a debug support circuit coupled to the multithreading control circuit via a context access bus, wherein the multithreading control circuit is further configured to facilitate a first debug operation re-using the hardware context switch circuitry by:
in response to having received a halt request from the debug support circuit, causing execution of a first thread running on the processor core to be suspended;
saving a context of the first thread into the context memory distinct from the processor core;
facilitating performance, by the processor core, of a first debug thread upon the context of the first thread stored in the context memory; and
in response to having received a go command from the debug support circuit, saving a context of the first debug thread into the context memory and providing the context of the first debug thread from the context memory to the debug support circuit via the context access bus.

2. The integrated circuit of claim 1, wherein each of a plurality of pipeline stages of the multithreading control circuit is sequentially switched from the first thread to the first debug thread in a cascaded fashion.

3. The integrated circuit of claim 1, wherein the halt request is issued in response to a command from debug software under execution by the processor core.

4. The integrated circuit of claim 1, wherein the processor core is configured to execute a second thread at least in part while the execution of the first thread is suspended.

5. The integrated circuit of claim 1, wherein the multithreading control circuit is configured to allow the processor core to resume execution of the first thread using the context of the first thread stored in the context memory in response to having received the go request.

6. The integrated circuit of claim 1, wherein the debug support circuit is configured to issue a second halt request to the multithreading control circuit, and wherein the multithreading control circuit is configured to, in response to having received the second halt request, facilitate a second debug operation by:
causing execution of a second thread running on the processor core to be suspended;
saving a context of the second thread into the context memory;
facilitating performance, by the processor core, of a second debug thread upon the context of the second thread stored in the context memory; and
in response to having received a second go command from the debug support circuit, saving a context of the second debug thread into the context memory and providing the context of the second debug thread from the context memory to the debug support circuit via the context access bus.

7. The integrated circuit of claim 1, wherein the multithreading control circuit is configured to receive a context switch command after having received the halt request, and wherein the multithreading control circuit is configured to prioritize execution of the context switch command over execution of the halt request.

8. A method, comprising:
in response to receiving a halt command from a debug support circuit and under control of a multithreading control circuit including hardware context switch circuitry responsible for performing multithreading operations within a processor core, wherein the hardware context switch circuitry includes two distinct sets of context registers and a separate context memory, wherein each of the two distinct sets of context registers is coupled to the multithreading control circuit, and wherein the context memory is coupled to the multithreading control circuit and to the sets of context registers via a context read/write controller, saving a context of a thread being executed by the processor core to the context memory distinct from the processor core, wherein the multithreading control circuit is coupled to the debug support circuit via a context access bus;
suspending execution of the thread using the hardware context switch circuitry; and
initiating a debug of the thread by accessing, using the hardware context switch circuitry, the context stored in the context memory.

9. The method of claim 8, further comprising executing a second thread at least in part while the execution of the thread is suspended.

10. The method of claim 8, further comprising:
in response to receiving a go command, loading the context of the thread from the context memory onto the processor core; and
resuming execution of the thread.

11. The method of claim 10, further comprising executing a second thread using a second context stored in the context memory prior to receipt of the go command.

12. The method of claim 11, further comprising:
in response to receiving a second halt command, saving a second context of a second thread being executed by the processor in the context memory;
suspending execution of the second thread; and
initiating a debug of the second thread at least in part concurrently with the debug of the thread using the second context stored in the context memory.

13. The method of claim 12, further comprising:
receiving a context switch command after having received the halt command, and prioritizing execution of the context switch command over execution of the halt command.

14. A debug support circuit, comprising:
a logic unit; and
a memory coupled to the logic unit, the memory having program instructions stored thereon that, upon execution by the logic unit, cause the debug support circuit to:
transmit a first command to hardware context switch circuitry of a multithreading control circuit responsible for performing multithreading operations within a processor, wherein the multithreading control circuit is coupled to the processor, wherein the hardware context switch circuitry includes at least two separate sets of context registers and a distinct context memory, wherein each of the two distinct sets of context registers is coupled to the multithreading control circuit, and wherein the context memory is coupled to the multithreading control circuit and to the sets of context registers via a context read/write controller, and wherein the multithreading control circuit is configured to cause execution of a thread running on the processor to be suspended and save a context of the thread into the context memory in response to the first command;

determine that a debug operation has been completed with respect to the thread re-using the hardware context switch circuitry; and transmit a second command to the hardware context switch circuitry, wherein the hardware context switch circuitry is configured to allow the processor to resume execution of the thread in the context memory in response to the second command and to provide the logic unit with access to the context memory via a context access bus.

15. The debug support circuit of claim 14, wherein the first and second commands are transmitted in response to a command from a hardware circuit coupled to the multithreading control circuit.

16. The debug support circuit of claim 14, wherein the first and second commands are transmitted in response to a command from software executed by the processor.

17. The debug support circuit of claim 14, wherein the processor is configured to execute a second thread at least in part while the execution of the thread is suspended.

18. The debug support circuit of claim 14, wherein the program instructions, upon execution by the logic unit, cause the debug support circuit to:

transmit a third command to the hardware context switch circuitry, wherein the hardware context switch circuitry is configured to, in response to having received the third command, cause execution of a second thread running on the processor to be suspended and save a context of the second thread into the context memory;

determine that a second debug operation has been completed with respect to the second thread re-using the hardware context switch circuitry; and transmit a fourth command to the hardware context switch circuitry, wherein the hardware context switch circuitry is configured to allow the processor to resume execution of the second thread in response to the fourth command.

19. The debug support circuit of claim 18, wherein the third command is transmitted prior to transmission of the second command and while execution of the thread is suspended.

* * * * *